United States Patent [19]

Galer et al.

[11] 4,286,992

[45] Sep. 1, 1981

[54] VERY HIGH EARLY STRENGTH CEMENT

[75] Inventors: Richard E. Galer, Hanover Park; Paul C. Webb, Arlington Heights, both of Ill.

[73] Assignee: United States Gypsum Company, Chicago, Ill.

[21] Appl. No.: 143,667

[22] Filed: Apr. 25, 1980

[51] Int. Cl.$^3$ .............................................. C04B 7/352
[52] U.S. Cl. ........................................ 106/90; 106/92; 106/104; 106/315
[58] Field of Search ..................... 106/90, 92, 315, 104

[56] References Cited

U.S. PATENT DOCUMENTS

| | | | |
|---|---|---|---|
| 3,860,433 | 1/1975 | Ost et al. ............................... | 106/89 |
| 3,885,985 | 5/1975 | Serafin et al. ........................... | 106/92 |
| 3,973,978 | 8/1976 | Nakagawa et al. ..................... | 106/95 |
| 4,058,407 | 11/1977 | Ray ......................................... | 106/92 |

*Primary Examiner*—James Poer
*Attorney, Agent, or Firm*—Robert M. Didrick; Robert H. Robinson; Samuel Kurlandsky

[57] ABSTRACT

A combination of a hydroxy polycarboxylic acid and sucrose improves the water-demand, setting, and compressive strength properties of a calcium sulfoaluminate cement to a greater degree than would be the case if the hypothetical cumulative effect of two admixtures were operative.

20 Claims, No Drawings

VERY HIGH EARLY STRENGTH CEMENT

This invention relates to high aluminate cements which produce upon hydration a substantial amount of tricalcium aluminosulfate hydrates. It particularly relates to cement compositions of this type which contain a synergistic combination of a saccharide and a hydroxy polycarboxylic acid. Further, it relates to high aluminate cements which may be handled and transported for a longer period of time before setting than is usual with such cements. More particularly, it relates to cements containing the ternary compound, $3CaO.3Al_2O_3.CaSO_4$, hereinafter referred to as CSA.

The economy and versatility of Portland cements, along with their high ultimate strengths, have made them pre-eminent among hydraulic cements despite their practical limitations of being slow to set and slow to develop the strength necessary to be self-supporting. The development of Type III Portland cement was an early response to the need for a faster setting, early strength cement. Calcium halo-aluminates have been incorporated into Portland cement compositions to achieve shortened but controllable setting times. Mixtures of a halo-aluminate cement and a calcium sulfate anhydrite have been offered as early strength cements. Cement mortars containing CSA, calcium sulfate and dicalcium silicate set quickly and develop compressive strengths of about 2900 psi and higher within 24 hours after mixing with water.

The setting times for many of these early strength cements however, is too fast—not enough time is allowed for mixing, transporting, and proper placing. This problem was addressed by Nakagawa et al in U.S. Pat. No. 3,973,978. The solution proposed therein was to prepare two separate mixtures—a Portland cement paste and a quick hardening agent—and then mixing the two at the job site. The need for special equipment such as a Y-tube, metering apparatus and an additional mixer is apparent from the description of the patented method.

The quick hardening agent of Nakagawa et al optionally contains a setting retarder and/or a quick hardening accelerator. The setting retarders listed are the organic carboxylic acids conventionally used, such as gluconic, tartaric, salicylic, citric, and malic acid. The hydroxides and carbonates of alkaline earth metals and alkali metals are described as quick hardening accelerators.

In U.S. Pat. No. 3,860,433, Ost et al teach that very high early strength cements containing CSA, calcium sulfate and dicalcium silicate usually can be produced to have an initial set in about 20 minutes but that conventional retarders such as sucrose, boric acid, and mucic acid (i.e. tetrahydroxyadipic acid) may be added.

A water-repelling and set-retarding admixture for incorporation in Portland cements and other hydraulic cements is taught by Serafin et al in U.S. Pat. No. 3,885,985. Serafin et al teach the use of many various materials and mixtures thereof as set-retarding agents. Included among these are polyhydroxy polycarboxylic compounds and saccharides such as glucose, fructose, lactose, sucrose, starch and cellulose.

According to U.S. Pat. No. 4,058,407, combinations of admixtures are frequently used in hydraulic cements to achieve certain results or overcome inefficiencies, such as where an admixture does not produce a sufficient improvement in the compressive strength or does not effect the desired degree of retardation. Several admixtures, such as lignosulfonates, salts of hydroxycarboxylic acids, sugars, and polysaccharides are listed as having the multiple effects of water reduction, set retardation and compressive strength improvement.

Now, it has been discovered, however, that sucrose accelerates the setting of the very high early strength cements containing CSA taught by Ost et al. It also have been discovered that a combination of sucrose and a hydroxypolycarboylic acid reverses the effect of the sucrose and that the setting time is longer than would have been expected from a consideration of the sum of the individual effects. In further contrast to the teachings of the prior art, the hypothetical cumulative effect of the sucrose/hydroxy polycarboxylic acid combination would be a lower compressive strength of the cement than that of the cement with neither admixture whereas the observed effect of the combination is a greater compressive strength. Finally, the sucrose/acid combination synergises the water-reducing effect of each agent.

It is an object of this invention, therefore, to provide a hydraulic cement composition having a high early strength when hydrated but whose initial setting time is retarded sufficiently to allow proper placing after mixing it with water and transporting the mixture to a job site.

It is another object of this invention to provide such a cement composition having a compressive strength which is synergistically increased by a combination of admixtures whose hypothetical cumulative effect would be to decrease the compressive strength.

It is a further object of this invention to provide a cement composition which is very fluid and essentially self-leveling without sacrificing strength.

These and other objects which will become apparent from the following disclosure are achieved by a cement composition which comprises, on a dry weight basis, from about 3.75% to about 40% of CSA, from about 0.1% to about 2% of a hydroxy polycarboxylic acid, from about 0.25% to about 4% of sucrose, from about 0.1% to about 5% of lime, from about 3% to about 35% of calcium sulfate, and dicalcium silicate to make up the substantial remainder.

The dicalcium silicate generally is present in amounts ranging from about 20% to about 90% of the total dry weight of the composition.

A preferred composition comprises from about 10% to about 30% of CSA. Particularly preferred is a composition comprising from about 15% to about 25% CSA.

The hydroxy polycarboxylic acid contemplated in the invention is exemplified by citric acid, tartaric acid, malic and mucic acid. It contains up to about 6 carbon atoms and up to about 4 hydroxyl groups. Citric acid is preferred. The admixtures may be used in their solid forms but also as aqueous solutions. Dilute aqueous solutions of the admixtures may be used as all or part of the mix water when the cement is used to make a paste, grout, mortar or concrete.

It is evident that the introduction of the acid into a system containing basic calcium will result in the in situ formation of the calcium salt. Therefore, other soluble sources of the carboxylate ion are contemplated as an admixture in this invention.

The setting of the cement compositions is retarded by the presence of from about 0.25% to about 1% of the hydroxy polycarboxylic acid and from about 0.25% to about 4% of sucrose when the weight ratio of sucrose to the acid is from about 1:1 to about 6:1. Among the preferred compositions having a retarded set are those comprising about 0.25% citric acid and from about 0.25% to about 0.5% sucrose, those comprising about 0.5% citric acid and from about 0.5% to about 3% sucrose, those comprising about 1% citric acid and from about 1% to about 2% sucrose, and those comprising about 1% citric acid and about 4% sucrose.

The water reducing effect of the sucrose/hydroxy polycarboxylic acid combination is greater than the sum of the individual effects at three different levels of concentration: (1) at about 0.5% of the acid and a sucrose/acid ratio of from about 1:1 to about 8:1; (2) at about 1% of the acid and a sucrose/acid ratio of from about 2:1 to about 4:1; and (3) at about 2% each of the aid and sucrose. A composition containing about 0.5% of citric acid is preferred.

The early and the ultimate compressive strengths of a hydrated cement composition of this invention are increased by the presence of from about 0.1% to about 2% of the hydroxy polycarboxylic acid and from bout 0.25% to about 4% of sucrose regardless of the ratio of one to the other. Preferred from this purpose are compositions comprising from about 0.1% to about 0.25% citric acid and from about 0.25% to about 0.5% sucrose, compositions comprising about 0.5% citric acid and from about 0.5% to about 4% sucrose, and compositions comprising about 1% citric acid and from about 1% to about 3% sucrose. Expecially preferred are compositions comprising from about 0.1% to about 0.25% citric and from about 0.25% to about 0.5% sucrose.

The composition contemplated in the invention includes the dry cement composition, neat pastes thereof, grouts, mortars, and concrete mixes. The addition of the admixture may be made, according to whether the admixture is in its solid form or in solution, at the time of preparing the dry cement or when the composition is mixed with water at a mixing plant or at the job site.

The following specific examples illustrate further the method and composition of this invention. All concentrations stated herein are in terms of percentage based upon the total weight of the dry cement composition unless otherwise indicated.

EXAMPLE I

Water Demand Reduction

Sand and cement at a ratio of 2.75 to 1 are charged to a mixer. The calculated compound composition of the cement is 18.9% CSA, 22.2% calcium sulfate, 46% dicalcium silicate and 1.6% tetracalcium aluminoferrite, and 4.4% lime. Its oxide analysis is as follows: 53.1% CaO, 9.8% $Al_2O_3$, 0.5% $Fe_2O_3$, 16.1% $SiO_2$, 15.6% $SO_3$, 0.7% $Na_2O$ and minor amounts of the oxides of magnesium, titanium and potassium. Granular sucrose is added and the dry materials are mixed for two minutes before the mix water and an aqueous solution of citric acid are added. Mixing is continued for three minutes.

The flow is measured 4 minutes after the addition of water. Because the water/cement ratio (W/C) varies from one mortar to another and the flow is roughly proportional to that ratio, the effect of the admixtures is determined by comparing the "fluidity factor" (4 minute flow value ÷ W/C) of the treated mortars with that of the control (i.e., containing neither admixture).

The percentage of citric acid and sucrose, the W/C, and the test results are given in Table I.

EXAMPLE 2

Set Retarding Effect

TABLE I

| Mortar | % Citric Acid | % Sucrose | W/C | Flow (4 min.) | Fluidity Factor | Difference (x − A) Actual | Cumulative |
|---|---|---|---|---|---|---|---|
| A | 0 | 0 | 0.623 | 108.7 | 174.5 | — | — |
| B | 0.5 | 0 | 0.547 | 100.9 | 184.5 | +10 | |
| C | 0 | 0.5 | 0.577 | 104.1 | 180.4 | +5.9 | +15.9 |
| D | 0.5 | 0.5 | 0.533 | 104.2 | 195.5 | +21.0 | |
| B | 0.5 | 0 | 0.547 | 100.9 | 184.5 | +10.0 | |
| E | 0 | 1 | 0.560 | 100.3 | 179.1 | +4.6 | +14.6 |
| F | 0.5 | 1 | 0.517 | 110.7 | 214.1 | +39.6 | |
| B | 0.5 | 0 | 0.547 | 100.9 | 184.5 | 10 | |
| G | 0 | 2.00 | 0.541 | 90.3 | 166.9 | −7.6 | +2.4 |
| H | 0.5 | 2.00 | 0.481 | 97.1 | 201.9 | +27.4 | |
| B | 0.5 | 0 | 0.547 | 100.9 | 184.5 | +10.0 | |
| J | 0 | 3.00 | 0.552 | 107.5 | 194.7 | +20.2 | +30.2 |
| K | 0.5 | 3.00 | 0.491 | 115.8 | 235.8 | +61.3 | |
| B | 0.5 | 0 | 0.547 | 100.9 | 184.5 | +10.0 | |
| L | 0 | 4.00 | 0.540 | 103.8 | 192.2 | +17.7 | +27.7 |
| M | 0.5 | 4.00 | 0.473 | 100.9 | 213.3 | +38.8 | |
| N | 1 | 0 | 0.561 | 114.8 | 204.6 | +30.1 | |
| C | 0 | 0.5 | 0.577 | 104.1 | 180.4 | +5.9 | +36.0 |
| P | 1 | 0.5 | 0.505 | 98.4 | 194.8 | +20.3 | |
| R | 2 | 0 | 0.577 | 126.6 | 219.4 | +44.9 | |
| C | 0 | 0.5 | 0.577 | 104.1 | 180.4 | +5.9 | +50.8 |
| S | 2 | 0.5 | 0.509 | 95.8 | 188.2 | +13.7 | |
| N | 1 | 0 | 0.561 | 114.8 | 204.6 | +30.1 | |
| E | 0 | 1 | 0.560 | 100.3 | 179.1 | +4.6 | +34.7 |
| T | 1 | 1 | 0.491 | 95.5 | 194.5 | +20 | |
| N | 1.0 | 0 | 0.561 | 114.8 | 204.6 | +30.1 | |
| G | 0 | 2.0 | 0.541 | 90.3 | 166.9 | −7.6 | +22.5 |
| U | 1.0 | 2.0 | 0.493 | 110.5 | 224.1 | +49.6 | |
| N | 1.0 | 0 | 0.561 | 114.8 | 204.6 | +30.1 | |
| J | 0 | 3.0 | 0.552 | 106.5 | 194.7 | +20.2 | +50.3 |
| V | 1.0 | 3.0 | 0.467 | 110.6 | 236.8 | +62.3 | |
| N | 1.0 | 0 | 0.561 | 114.8 | 204.6 | +30.1 | |
| L | 0 | 4.0 | 0.540 | 103.8 | 192.2 | +17.7 | +47.8 |
| W | 1.0 | 4.0 | 0.483 | 120.1 | 248.6 | +74.1 | |
| R | 2.0 | 0 | 0.577 | 126.6 | 219.4 | +44.9 | |
| E | 0 | 1.0 | 0.560 | 100.3 | 179.1 | +4.6 | +49.5 |

TABLE I-continued

| Mortar | % Citric Acid | % Sucrose | W/C | Flow (4 min.) | Fluidity Factor | Difference (x − A) Actual | Cumulative |
|---|---|---|---|---|---|---|---|
| X | 2.0 | 1.0 | 0.541 | 116.1 | 214.6 | +40.1 | |
| R | 2.0 | 0 | 0.577 | 126.6 | 219.4 | +44.9 | |
| G | 0 | 2.0 | 0.541 | 90.3 | 166.9 | −7.6 | +37.3 |
| Y | 2.0 | 2.0 | 0.519 | 116.8 | 225.0 | +50.5 | |

TABLE II

| Mortar | % Citric Acid | % Sucrose | W/C | Initial Set | Difference (x − A) Actual | Cumulative |
|---|---|---|---|---|---|---|
| A | 0 | 0 | 0.623 | 29 | — | — |
| B | 0.5 | 0 | 0.547 | 34 | +5 | 0 |
| C | 0 | 0.5 | 0.577 | 24 | −5 | |
| D | 0.5 | 0.5 | 0.533 | 38 | +9 | |
| B | 0.5 | 0 | 0.547 | 34 | +5 | −2 |
| E | 0 | 1 | 0.560 | 22 | −7 | |
| F | 0.5 | 1 | 0.517 | 36 | +7 | |
| B | 0.5 | 0 | 0.547 | 34 | +5 | −4 |
| G | 0 | 2 | 0.541 | 20 | −9 | |
| H | 0.5 | 2 | 0.481 | 34 | +5 | |
| B | 0.5 | 0 | 0.547 | 34 | +5 | −2 |
| J | 0 | 3 | 0.552 | 22 | −7 | |
| K | 0.5 | 3 | 0.491 | 39 | +10 | |
| B | 0.5 | 0 | 0.547 | 34 | +5 | +4 |
| L | 0 | 4 | 0.540 | 28 | −1 | |
| M | 0.5 | 4 | 0.473 | 32 | +3 | |
| N | 1 | 0 | 0.561 | 52 | +23 | +18 |
| C | 0 | 0.5 | 0.577 | 24 | −5 | |
| P | 1 | 0.5 | 0.505 | 48 | +19 | |
| R | 2 | 0 | 0.577 | 77 | +48 | +43 |
| C | 0 | 0.5 | 0.577 | 24 | −5 | |
| S | 2 | 0.5 | 0.509 | 51 | +22 | |
| N | 1 | 0 | 0.561 | 52 | +23 | +16 |
| E | 0 | 1 | 0.560 | 22 | −7 | |
| T | 1 | 1 | 0.491 | 51 | +22 | |
| N | 1 | 0 | 0.561 | 52 | +23 | +14 |
| G | 0 | 2 | 0.541 | 20 | −9 | |
| U* | 1 | 2 | 0.493 | 68 | +39 | |
| N | 1 | 0 | 0.561 | 52 | +23 | +16 |
| J | 0 | 3 | 0.552 | 22 | −7 | |
| V* | 1 | 3 | 0.467 | 44 | +15 | |
| N | 1 | 0 | 0.561 | 52 | +23 | +22 |
| L | 0 | 4 | 0.540 | 28 | −1 | |
| W* | 1 | 4 | 0.483 | 70 | +41 | |
| B | 0.5 | 0 | 0.547 | 34 | +5 | −2 |
| E | 0 | 1 | 0.560 | 22 | −7 | |
| FF | 0.5 | 1 | 0.493 | 21 | −8 | |
| N | 1 | 0 | 0.561 | 52 | +23 | +14 |
| G | 0 | 2 | 0.541 | 20 | −9 | |
| UU* | 1 | 2 | 0.493 | 36 | +7 | |

*Thixotropic
NOTE:
Sucrose added as a solution in samples FF and UU.

The time of initial set of the mortars described in Example 1 is determined by placing a Gillmore initial set needle on a set pat of the mortar and noting the time, measured from the addition of water, at which the needle fails to leave a mark on the surface of the pat. The test results are given in Table II.

For testing purposes it is desirable to have a 4 minute flow value of about 110. To achieve that goal the water/cement ratio is varied. It is generally accepted that the compressive strength of a hydrated cement composition is roughly inversely proportional to the water/cement ratio. To compensate for the differing water/cement ratios used, therefore, the observed compressive strength values shown in Tables III and IV are adjusted to indicate what the strengths would be at constant ratios of 0.623 and 0.56, the ratios used in the respective control compositions.

It is recognized that the relation of compressive strength to the water/cement ratio is not fully linear but the adjusted strength values do indicate the relative ability of an admixture to affect the strength development of the cement composition. The large differences between the adjusted values for the combination and those for the hypothetical cumulative effect shown in Tables III and IV are greater than the divergence from linearity.

EXAMPLE 3

Effect on Compressive Strength

Each mortar of Example 1 is cast into two-inch cubes and the cubes are cured while in the mold under a moist atmosphere for 3 hours, at which time they are stripped from the molds. The compressive strength of one cube from each mortar is determined 24 hours after the addition of the mix water. Curing of the remaining cubes is continued under water for 182 days, at which time the compressive strengths are determined again.

TABLE III

COMPRESSIVE STRENGTH (PSI)

| Mortar | % Citric Acid | % Sucrose | W/C | 24 Hr. | 24 Hr. at W/C = 0.623 | Difference (x − A) Actual | Cumulative | 182 day | 182 Day at W/C = 0.623 | Difference (x − A) Actual | Cumulative |
|---|---|---|---|---|---|---|---|---|---|---|---|
| A | 0 | 0 | 0.623 | 3845 | 3845 | — | — | 5781 | 5781 | — | — |
| B | 0.5 | 0 | 0.547 | 3950 | 3468 | −377 | −1105 | 5819 | 5109 | −672 | −595 |
| C | 0 | 0.5 | 0.577 | 3365 | 3117 | −728 | | 6325 | 5858 | +77 | |
| D | 0.5 | 0.5 | 0.533 | 4800 | 4106 | +261 | | 7038 | 6021 | +240 | |
| B | 0.5 | 0 | 0.547 | 3950 | 3468 | −377 | −1251 | 5819 | 5109 | −672 | −1274 |
| E | 0 | 1.0 | 0.560 | 3305 | 2971 | −874 | | 5762 | 5179 | −602 | |
| F | 0.5 | 1.0 | 0.517 | 4865 | 4037 | +192 | | 7825 | 6494 | +713 | |
| B | 0.5 | 0 | 0.547 | 3950 | 3468 | −377 | −1174 | 5819 | 5109 | −672 | −1030 |
| G | 0 | 2.0 | 0.541 | 3510 | 3048 | −797 | | 6245 | 5423 | −358 | |
| H | 0.5 | 2.0 | 0.481 | 5685 | 4389 | +544 | | 8475 | 6543 | +762 | |
| B | 0.5 | 0 | 0.547 | 3950 | 3468 | −377 | −1537 | 5819 | 5109 | −672 | −1403 |
| J | 0 | 3.0 | 0.552 | 3030 | 2685 | −1160 | | 5700 | 5050 | −731 | |
| K | 0.5 | 3.0 | 0.491 | 5168 | 4073 | +228 | | 7519 | 5926 | +145 | |

TABLE III-continued

COMPRESSIVE STRENGTH (PSI)

| Mortar | % Citric Acid | % Sucrose | W/C | 24 Hr. | 24 Hr. at W/C = 0.623 | Difference (x − A) Actual | Difference (x − A) Cumulative | 182 day | 182 Day at W/C = 0.623 | Difference (x − A) Actual | Difference (x − A) Cumulative |
|---|---|---|---|---|---|---|---|---|---|---|---|
| B | 0.5 | 0 | 0.547 | 3950 | 3468 | −377 | −1418 | 5819 | 5109 | −672 | −1675 |
| L | 0 | 4.0 | 0.540 | 3235 | 2804 | −1041 | | 5512 | 4778 | −1003 | |
| M | 0.5 | 4.0 | 0.473 | 5623 | 4269 | +424 | | 8112 | 6159 | +378 | |
| C | 0 | 0.5 | 0.577 | 3365 | 3117 | −728 | −1048 | 6325 | 5858 | +77 | −869 |
| N | 1.0 | 0 | 0.561 | 3915 | 3525 | −320 | | 5369 | 4835 | −946 | |
| P | 1.0 | 0.5 | 0.505 | 4725 | 3830 | −15 | | 7150 | 5796 | +15 | |
| C | 0 | 0.5 | 0.577 | 3365 | 3117 | −728 | −1105 | 6325 | 5858 | +77 | −1131 |
| R | 2.0 | 0 | 0.577 | 3745 | 3468 | −377 | | 4938 | 4573 | −1208 | |
| S | 2.0 | 0.5 | 0.509 | 4763 | 3891 | +46 | | 7112 | 5810 | +29 | |
| E | 0 | 1.0 | 0.560 | 3305 | 2971 | −874 | −1194 | 5762 | 5179 | −602 | −1548 |
| N | 1.0 | 0 | 0.561 | 3915 | 3525 | −320 | | 5369 | 4835 | −946 | |
| T | 1.0 | 1.0 | 0.491 | 5075 | 4000 | +155 | | 8075 | 6364 | +583 | |
| G | 0 | 2.0 | 0.541 | 3510 | 3048 | −797 | −1117 | 6245 | 5423 | −358 | −1304 |
| N | 1.0 | 0 | 0.561 | 3915 | 3525 | −320 | | 5369 | 4835 | −946 | |
| U | 1.0 | 2.0 | 0.493 | 5525 | 4372 | +527 | | 7938 | 6281 | +500 | |
| J | 0 | 3.0 | 0.552 | 3030 | 2685 | −1160 | −1480 | 5700 | 5050 | −731 | −1677 |
| N | 1.0 | 0 | 0.561 | 3915 | 3525 | −320 | | 5369 | 4835 | −946 | |
| V | 1.0 | 3.0 | 0.467 | 6419 | 4812 | +967 | | 8531 | 6395 | +614 | |
| L | 0 | 4.0 | 0.540 | 3235 | 2804 | −1041 | −1361 | 5512 | 4778 | −1003 | −1949 |
| N | 1.0 | 0 | 0.561 | 3915 | 3525 | −320 | | 5368 | 4835 | −946 | |
| W | 1.0 | 4.0 | 0.483 | 5525 | 4283 | +438 | | 7489 | 5805 | +24 | |
| E | 0 | 1.0 | 0.560 | 3305 | 2971 | −874 | −1251 | 5762 | 5179 | −602 | −1820 |
| R | 2.0 | 0 | 0.577 | 3745 | 3468 | −377 | | 4938 | 4573 | −1208 | |
| X | 2.0 | 1.0 | 0.541 | 4113 | 3572 | −273 | | 6762 | 5872 | +91 | |
| G | 0 | 2.0 | 0.541 | 3510 | 3048 | −797 | −1174 | 6245 | 5423 | −358 | −1566 |
| R | 2.0 | 0 | 0.577 | 3745 | 3468 | −377 | | 4938 | 4573 | −1208 | |
| Y | 2.0 | 2.0 | 0.519 | 4763 | 3968 | +123 | | 6931 | 5774 | −7 | |
| J | 0 | 3.0 | 0.552 | 3030 | 2685 | −1160 | −1537 | 5700 | 5050 | −731 | 1939 |
| R | 2.0 | 0 | 0.577 | 3745 | 3468 | −377 | | 4938 | 4573 | −1208 | |
| Z | 2.0 | 3.0 | 0.487 | 5388 | 4212 | +367 | | 7256 | 5672 | −102 | |
| L | 0 | 4.0 | 0.540 | 3235 | 2804 | −1041 | −1418 | 5512 | 4778 | −1003 | −2211 |
| R | 2.0 | 0 | 0.577 | 3745 | 3468 | −377 | | 4938 | 4573 | −1208 | |
| ZZ | 2.0 | 4.0 | 0.475 | 5925 | 4516 | +671 | | 8356 | 6370 | +589 | |
| L | 0 | 4.0 | 0.540 | 3235 | 2804 | −1041 | −1418 | 5512 | 4778 | −1003 | −2211 |
| R | 2.0 | 0 | 0.577 | 3745 | 3468 | −377 | | 4938 | 4573 | −1208 | |
| ZZ* | 2.0 | 4.0 | 0.480 | 4790 | 3690 | −155 | | 6825 | 5258 | −523 | |
| B | 0.5 | 0 | 0.547 | 3950 | 3468 | −377 | −1251 | 5819 | 5109 | −672 | −1274 |
| E | 0 | 1.0 | 0.560 | 3305 | 2971 | −874 | | 5762 | 5179 | −602 | |
| FF* | 0.5 | 1.0 | 0.493 | 5055 | 4000 | +155 | | 7819 | 6187 | +406 | |
| G | 0 | 2.0 | 0.541 | 3510 | 3048 | −797 | −1117 | 6245 | 5423 | −358 | −1305 |
| N | 1.0 | 0 | 0.561 | 3915 | 3525 | −320 | | 5369 | 4834 | −947 | |
| UU* | 1.0 | 2.0 | 0.493 | 5170 | 4091 | +246 | | 7475 | 5915 | +134 | |

*Sucrose added as a solution

The amounts of each admixture and the water/cement ratio for each mortar is indicated in Table III.

EXAMPLE 4

The mortars shown in Table IV comprise a cement having the following analysis:

| | |
|---|---|
| CaO | 51.7% |
| $Al_2O_3$ | 12.3% |
| $SiO_2$ | 16.0% |
| $SO_3$ | 14.1% |
| $Fe_2O_3$ | 2.3% |
| $Na_2O$ | 0.1% |
| MgO | Minor |
| $TiO_2$ | Minor |
| $K_2O$ | Minor | and the calculated compound composition: 21.6% CSA, 17.6% calcium sulfate, 45.9% dicalcium silicate, 7.1% tetracalcium aluminoferrite. These mortars are mixed according to the general procedure of Example 1 except that the sucrose, as well as the citric acid, is added as an aqueous solution along with the mix water. The compressive strengths given in Table IV are determined in the same manner as in Example III but not beyond the 7 day curing period.

The time of initial set of the mortars described in Example 4 and Table IV is given in Table V. The results show that the citric acid/sucrose combination synergistically retards the set at concentrations of 0.25% acid/0.25% sucrose and 0.25% acid/0.5% sucrose.

TABLE IV

COMPRESSIVE STRENGTH (PSI)

| Mortar | % Citric Acid | % Sucrose | W/C | 24 Hr. | 24 Hr. at W/C = 0.56 | Difference (x − A) Actual | Difference (x − A) Cumulative | 7 day | 7 Day at W/C = 0.56 | Difference (x − A) Actual | Difference (x − A) Cumulative |
|---|---|---|---|---|---|---|---|---|---|---|---|
| AA | 0 | 0 | 0.56 | 4210 | 4210 | — | — | 4350 | 4350 | — | — |
| BZ | 0.13 | 0 | 0.51 | 4465 | 4067 | −406 | 5050 | 4601 | 4350 | +251 | +350 |
| CZ | 0 | 0.25 | 0.52 | 4250 | 3947 | −263 | | 4790 | 4449 | +99 | |

TABLE IV-continued

| | % Citric Acid | % Sucrose | W/C | 24 Hr. | 24 Hr. at W/C= 0.56 | COMPRESSIVE STRENGTH (PSI) Difference (x − A) Actual | Cumulative | 7 day | 7 Day at W/C = 0.56 | Difference (x − A) Actual | Cumulative |
|---|---|---|---|---|---|---|---|---|---|---|---|
| Mortar | | | | | | | | | | | |
| DZ | 0.13 | 0.25 | 0.49 | 4580 | 4008 | −202 | | 5480 | 4795 | +445 | |
| BZ | 0.13 | 0 | 0.51 | 4465 | 4067 | −143 | −667 | 5050 | 4601 | +251 | +52 |
| EZ | 0 | 0.50 | 0.52 | 3970 | 3686 | −524 | | 4470 | 4151 | −199 | |
| FZ | 0.13 | 0.50 | 0.48 | 4530 | 3883 | −327 | | 5375 | 4608 | +258 | |
| CZ | 0 | 0.25 | 0.52 | 4250 | 3947 | −263 | −124 | 4790 | 4449 | +99 | −54 |
| GZ | 0.25 | 0 | 0.50 | 4870 | 4349 | +139 | | 4700 | 4197 | −153 | |
| HZ | 0.25 | 0.25 | 0.48 | 4700 | 4029 | −181 | | >6000 | >5000 | >650 | |
| GZ | 0.25 | 0 | 0.50 | 4870 | 4349 | +139 | −386 | 4700 | 4197 | −153 | −252 |
| EZ | 0 | 0.50 | 0.52 | 3970 | 3686 | −525 | | 4470 | 4151 | −99 | |
| JZ | 0.25 | 0.50 | 0.47 | 4790 | 4020 | −190 | | 5738 | 4817 | +467 | |

TABLE V

| Mortar | % Citric Acid | % Sucrose | W/C | Initial Set | Difference (x − A) Actual | Cumulative |
|---|---|---|---|---|---|---|
| AA | 0 | 0 | 0.53 | 27 | | |
| EZ | 0.25 | 0 | 0.50 | 59 | +32 | +35 |
| CZ | 0 | 0.25 | 0.50 | 30 | +3 | |
| FZ | .0.25 | 0.25 | 0.50 | 72 | +45 | |
| EZ | 0.25 | 0 | 0.50 | 59 | +32 | +39 |
| GZ | 0 | 0.50 | 0.50 | 34 | +7 | |
| JZ | 0.25 | 0.50 | 0.50 | 73 | +46 | |

We claim:

1. A hydraulic cement composition comprising from about 3.75% to about 40% of $3CaO.3Al_2O_3.CaSO_4$, from about 0.1% to about 5% of lime, from about 3% to about 35% of calcium sulfate, dicalcium silicate, from about 0.1% to about 2% of a hydroxy polycarboxylic acid, and from about 0.25% to about 4% of sucrose, said amounts being based upon the total dry weight of said composition.

2. The composition of claim 1 wherein the acid is citric acid.

3. The composition of claim 2 wherein the amount of citric acid is from about 0.25% to about 1%, the amount of sucrose is from about 0.25% to about 4%, and the sucrose to acid ratio is from about 1:1 to about 6:1.

4. The composition of claim 2 wherein the amount of the citric acid is about 0.5% and the ratio of sucrose to acid is from about 1:1 to about 8:1.

5. The composition of claim 2 wherein the amount of citric acid is from about 0.1% to about 0.25% and the amount of sucrose is from about 0.25% to about 0.5%.

6. The composition of claim 2 wherein the amount of citric acid is about 1% and the amount of sucrose is from about 1% to about 3%.

7. The composition of claim 4 wherein the amount of citric acid is about 0.5% and the surcose to citric acid ratio is from about 1:1 to about 6:1.

8. The composition of claim 2 wherein the amount of citric acid is about 1% and the amount of sucrose is about 4%.

9. The composition of claim 2 wherein the amount of citric acid is about 2% and the amount of sucrose is about 2%.

10. The composition of claim 2 wherein the amount of citric acid is about 2% and the amount of sucrose is about 4%.

11. A method for preparing a cement composition comprising mixing from about 3.75% to about 40%, based on the total dry weight of the composition, of $3CaO.3Al_2O_3.CaSO_4$ with from about 0.1% to about 5% of lime, from about 3% to about 35% of calcium sulfate, from about 0.1% to about 2% of a hydroxy polycarboxylic acid, from about 0.25% to about 4% of sucrose, and dicalcium silicate as the substantial remainder.

12. The method of claim 11 wherein said acid is citric acid.

13. A method for retarding the setting of a cement composition comprising from about 4% to about 40% of the ternary compound $3CaO.3Al_2O_3.CaSO_4$, from about 0.1% to about 5% of lime, from about 3% to about 35% of calcium sulfate and dicalcium silicate as the substantial remainder, said method comprising the addition to said cement of a combination of admixtures consisting of from about 0.25% to about 1% of citric acid and from about 0.25% to about 4% of sucrose, based on the total dry weight of said cement and said admixtures, in which combination the ratio of sucrose to acid is from about 1:1 to about 6:1.

14. A method for reducing the demand for water in the formation of easily placeable cement/water mixes from a cement comprising from about 4% to about 40% of the ternary compound $3CaO.3Al_2O_3.CaSO_4$, from about 0.1% to about 5% of lime, from about 3% to about 35% of calcium sulfate, and dicalcium silicate as the substantial remainder, said method comprising the addition to said cement of a combination of admixtures consisting of about 0.5% citric acid and from about 0.5% to about 4% sucrose, based on the total dry weight of said cement and said admixtures.

15. A method of reducing the demand for water in the formation of easily placeable cement/water mixes from a cement comprising from about 4% to about 40% of the ternary compound $3CaO.3Al_2O_3.CaSO_4$, from about 0.1% to about 5% of lime, and about 3% to about 35% of calcium sulfate and dicalcium cilicate as the substantial remainder, said method comprising the addition to said cement of a combination of admixtures consisting of about 1% citric acid and from about 2% to about 4% sucrose, based on the total dry weight of said cement and said admixtures.

16. A method for reducing the demand for water in the formation of easily placeable cement/water mixes from a cement comprising from about 4% to about 40% of the ternary compound $3CaO.3Al_2O_3.CaSO_4$, from about 0.1% to about 5% of lime, from about 3% to about 35% of calcium sulfate, and dicalcium silcate as the substantial remainder, said method comprising the addition to said cement of a combination of admixtures consisting of about 2% of citric acid and 2% of sucrose, based on the total dry weight of said cement and said admixtures.

17. A method for increasing the compressive strength, upon full or partial hydration, of a hydraulic cement comprising from about 4% to about 40% of $3CaO.3Al_2O_3.CaSO_4$, from about 0.1% to about 5% of lime, from about 3% to about 35% of calcium sulfate, and dicalcium silicate as the substantial remainder, said method comprising the addition to said cement of a combination of admixtures consisting of about 1% citric acid and from about 1% to about 3% sucrose, based on the total dry weight of said cement and said admixtures.

18. A mortar comprising the hydraulic cement composition of claim 1 or claim 2.

19. A concrete prepared from the composition of claim 1 or claim 2.

20. A grout comprising the hydraulic cement composition of claim 1 or claim 2.

* * * * *

UNITED STATES PATENT AND TRADEMARK OFFICE
CERTIFICATE OF CORRECTION

PATENT NO. : 4,286,992
DATED : September 1, 1981
INVENTOR(S) : Richard E. Galer and Paul C. Webb It is certified that error appears in the above—identified patent and that said Letters Patent is hereby corrected as shown below:

In the Specification:

Columns 7 and 8

Table III, 10th line under the extreme right-hand column "Cumulative" change "1939" to -- -1939 --. (Omitted Minus Sign)

Table IV, under the last 6 column headings, correct first three lines to read as follows:

| Difference (x - A) | | 7 Day | 7 Day | Difference (x - A) | |
|---|---|---|---|---|---|
| Actual | Cumulative | 7 Day | At W/C=0.56 | Actual | Cumulative |
| -- | -- | 4350 | 4350 | -- | -- |
| -143 | -406 | 5050 | 4601 | +251 | +350 |
| -263 | | 4790 | 4449 | + 99 | |

Columns 9 and 10

Table IV, 3rd line from bottom, under first column "Cumulative" change "-386" to -- -385 --.

Signed and Sealed this

Second Day of February 1982

[SEAL]

Attest:

GERALD J. MOSSINGHOFF

Attesting Officer     Commissioner of Patents and Trademarks